(12) United States Patent
Takatori et al.

(10) Patent No.: US 7,502,551 B2
(45) Date of Patent: Mar. 10, 2009

(54) INSTANT FILM PACK

(75) Inventors: Tetsuya Takatori, Kanagawa (JP);
Tomoyuki Takahashi, Kanagawa (JP);
Kenji Kobayashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 553 days.

(21) Appl. No.: 11/156,657

(22) Filed: Jun. 21, 2005

(65) Prior Publication Data

US 2005/0281553 A1 Dec. 22, 2005

(30) Foreign Application Priority Data

Jun. 21, 2004 (JP) ............................. 2004-182870

(51) Int. Cl.
*G03B 17/50* (2006.01)
(52) U.S. Cl. .......................................... 396/30; 396/395
(58) Field of Classification Search .................... 396/30, 396/34–37, 395, 518
See application file for complete search history.

(56) References Cited

U.S. PATENT DOCUMENTS

| | | | | |
|---|---|---|---|---|
| 4,093,956 A | * | 6/1978 | Goto | ............................ 396/36 |
| 6,006,036 A | * | 12/1999 | Douglas | ........................ 396/6 |
| 6,195,508 B1 | | 2/2001 | Katayama et al. | |
| 6,463,213 B1 | * | 10/2002 | Kitagawa | ..................... 396/36 |
| 6,490,414 B2 | * | 12/2002 | Sasaki et al. | .................. 396/36 |
| 6,734,948 B2 | | 5/2004 | Futakami et al. | |

FOREIGN PATENT DOCUMENTS

JP  2001-356423 A  12/2001

* cited by examiner

*Primary Examiner*—Christopher Mahoney
(74) *Attorney, Agent, or Firm*—Sughrue Mion, PLLC

(57) ABSTRACT

A case body containing instant photo films includes an exit slot for feeding out one instant photo film after another, and a claw path opening for allowing entry of a claw member ejecting the instant photo films. A pair of thrust preventing flaps is disposed inside the exit slot, for closing the lateral ends of the exit slot to prevent the instant photo film thrusting out. The claw path opening is closed by a light shielding plate and a light shielding skirt, which compose a light shielding member. The light shielding plate is moved to an open position by the claw member in the first advancing operation, and is moved to a full-open position in the second advancing operation.

11 Claims, 12 Drawing Sheets

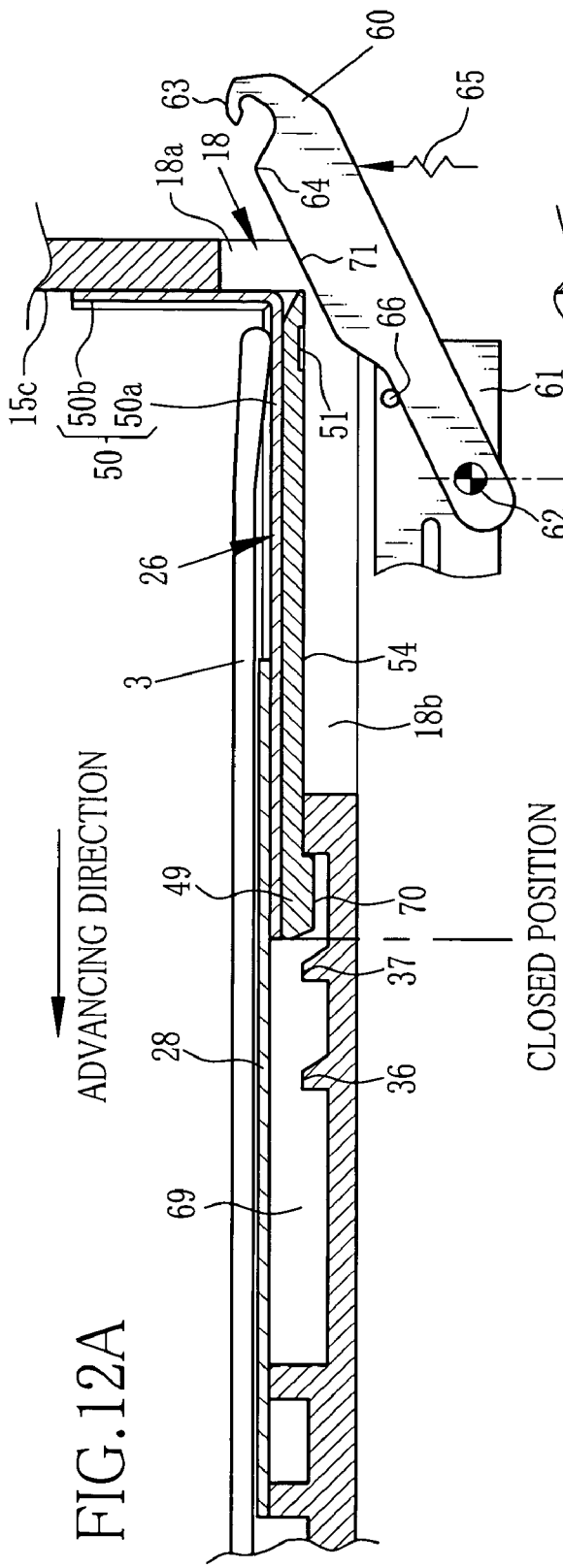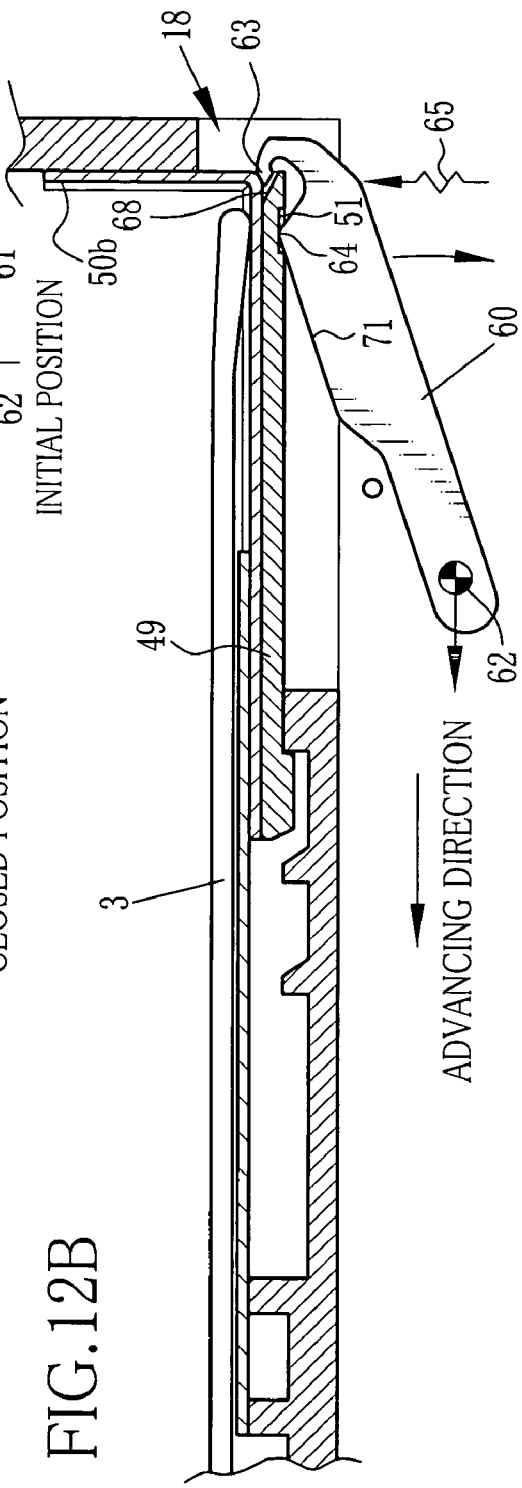

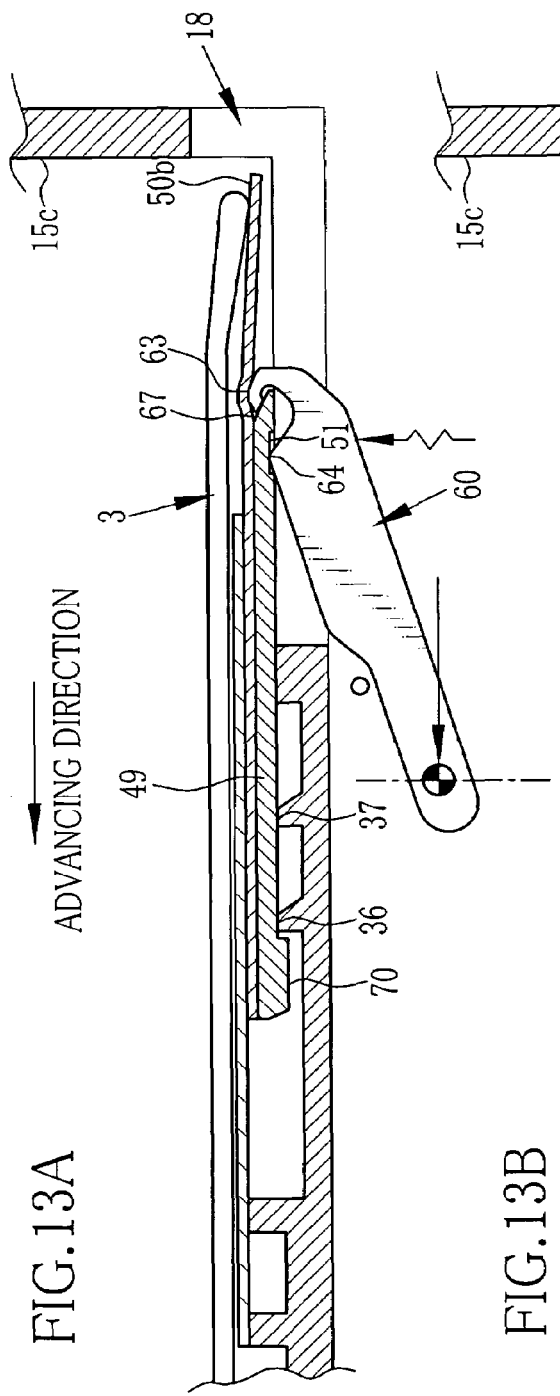
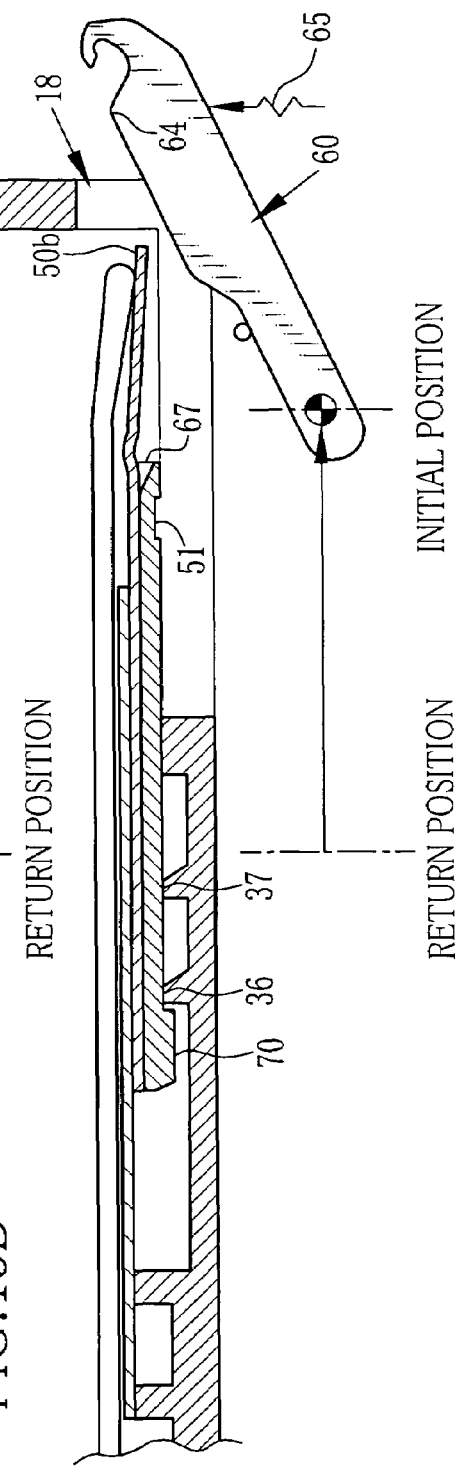
FIG.13A
FIG.13B

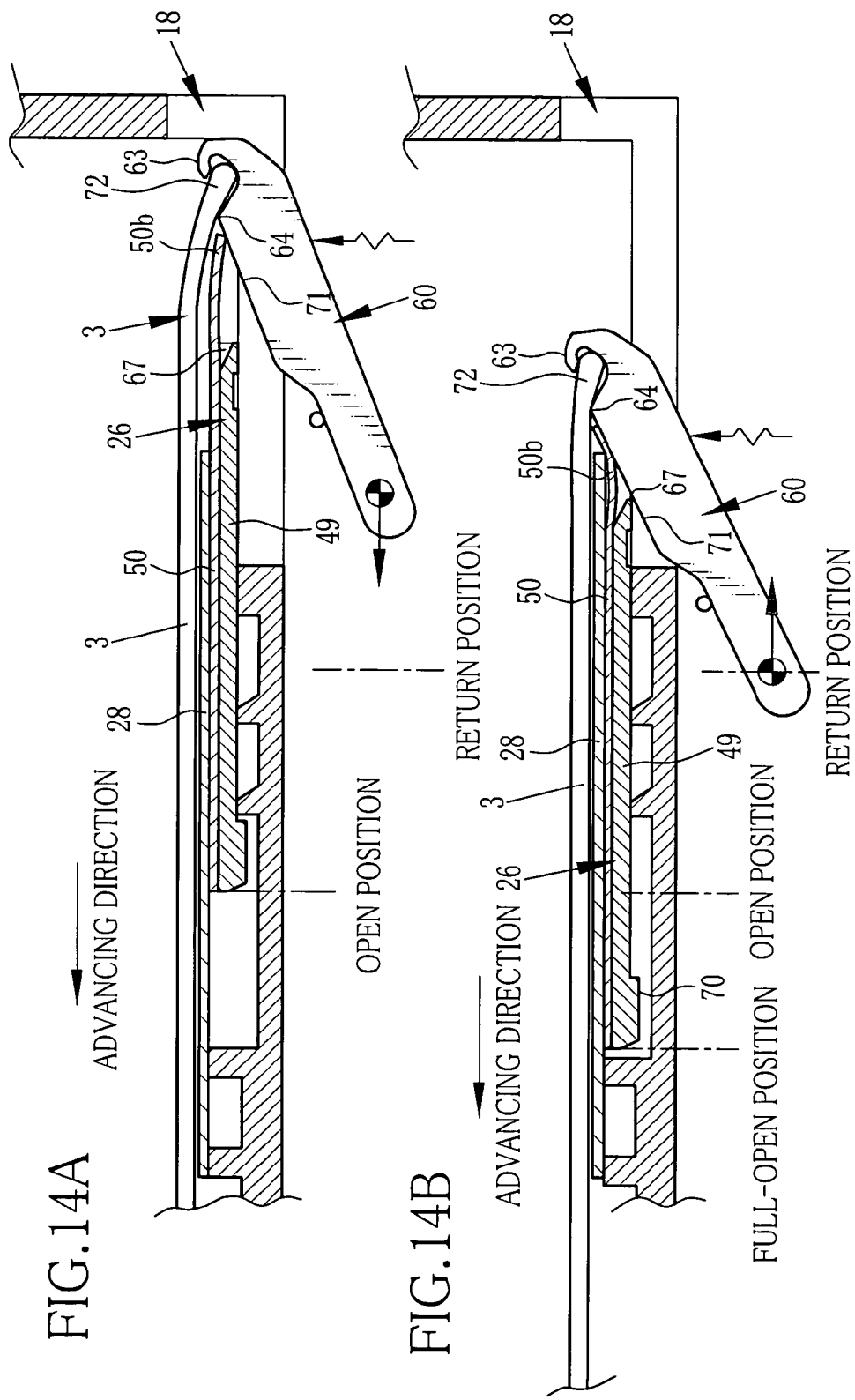

INSTANT FILM PACK

BACKGROUND OF THE INVENTION

1. Field of the Invention

The present invention relates to an instant film pack. More particularly, the present invention relates to an instant film pack used in an optical printer for printing an image on an instant film unit ejected from a case.

2. Description Related to the Prior Art

Various types of instant film packs are commercially available, each of which has a case in a box shape for containing plural numbers of instant film units of mono-sheet type. The instant film units here are the one called a self-developing type instant film unit, in which contained developing solution is spread for developing an exposed image after a photosensitive layer being exposed, and then the image is created on the instant film unit. The instant film unit of this type is mainly used with an instant camera.

The instant film unit is constituted by a transparent cover sheet, a base sheet facing the rear side of the cover sheet, a developing pod for containing developing solution and a trap portion for absorbing an excess of the developing solution which are disposed on the base sheet. On the base sheet, a photosensitive layer, a reflective layer, and an image-receiving layer are formed. According to the way of creating a printed image, the instant film units are classified into a transmission type and a reflection type. In the instant film units of the transmission type, the exposure surface is disposed on a different side from the positive image observation surface, on which a positive image appears. On the other hand, in the instant film units of the reflection type, the exposure surface is disposed on the same side as the surface of observing a positive image.

The instant film unit is set into the instant camera, with being contained in a light-tight case. The case is provided with an exposure opening, an exit slot, and a claw path opening. The exposure opening serves to expose the instant film unit. The exit slot is formed in a slit shape for ejecting the instant film unit being exposed. The claw path opening allows entry of a well-known claw member for advancing the instant film unit in the case toward the exit slot. (For example, ref. U.S. Pat. No. 6,195,508 corresponding to JP-A 2000-089351.)

Every opening of the case is light-shielded by the following elements. As for the exit slot, a light shielding flap in a sheet shape having a light-blocking property and flexibility is attached to an outer side thereof to close the exit slot. As for the exposure opening, a light shielding cover is used, which is sandwiched between the exposure opening and an uppermost instant film unit. The claw path opening is closed by a light shielding sheet having a light-blocking property and flexibility. One end of the light shielding sheet is attached to the light shielding cover. After the instant film pack loaded into the instant camera, the light shielding cover is ejected by the claw member from the case. At this time, the light shielding flap is pushed to open the exit slot. And the light shielding cover is ejected from the case along with the light shielding sheet for the claw path opening.

Further, the conventional instant film pack has a problem in that the leader end of the light shielding cover can possibly push to open the light shielding flap and partially thrust out from the exit slot if the instant film pack is dropped or subjected to a shock. In order to prevent such a problem, a thrust preventing flap is provided inside the exit slot to close the exit slot partially. The thrust preventing flap is also attached to the light shielding cover, such that it will be ejected outside the case together with the light shielding cover.

Various types of optical printers are released to use the instant film unit as a recording media, utilizing the characteristics of the instant film unit, such as completing an exposure in a brief time, printing available in a brief time after the exposure, developing without the waste, developing available by a relatively simple mechanism, and the like. (For example, ref. JP-A 2001-356423 and U.S. Pat. No. 6,734,948 corresponding to JP-A 2002-221778.)

The optical printers according to JP-A 2001-356423 and U.S. Pat. No. 6,734,948 (corresponding to JP-A 2002-221778) are a line printing type which exposes an image line by line with a line-shaped exposure head while feeding the instant film unit. Therefore, the exposure opening of a large size for exposing the whole exposure side at a time is unnecessary for the case of the instant film pack used in these optical printers. In the instant film pack according to JP-A 2001-356423, a slot shaped exposure opening is formed in the case. Furthermore, U.S. Pat. No. 6,734,948 (corresponding to JP-A 2002-221778) discloses the optical printer which advances the instant film unit from the case before performing exposure.

If the instant film pack does not have the exposure opening of the size enough to show the whole exposure side, the light shielding cover becomes unnecessary. If no light shielding cover is used, the instant film unit can possibly protrude from the exit slot when the instant film pack is dropped or subjected to strong vibration. Furthermore, if no light shielding cover is used, it is necessary to attach the light shielding sheet and the thrust preventing flap both ordinarily attached to the light shielding cover to the case. The light shielding sheet and the thrust preventing flap according to the prior art are ejected together with the light shielding cover. However, the light shielding sheet and the thrust preventing flap, once attached to the case, will always stay inside the case. Therefore, it is likely that the operation of the claw member and the ejection of the instant film unit are influenced by the light shielding sheet and the thrust preventing flap.

SUMMARY OF THE INVENTION

In view of the foregoing problems, an object of the present invention is to provide an instant film pack which blocks ambient light coming into a claw path opening and, at the same time, prevents thrusting out of instant film units, without harmfully affecting on the operation of a claw member and the ejection of the instant film units.

In order to achieve the above and other objects and advantages of this invention, an instant film pack includes thrust preventing members, for closing the lateral ends of an exit slot openably. The thrust preventing members prevent the first instant film unit facing to the exit slot at first from coming out of a case, through the exit slot. Each thrust preventing members has a secured portion and a free portion. The secured portion is fixed to the inner wall of the case. The free portion crosses the exit slot and is pushed by the leader end of the first instant film unit to come out of the exit slot. The secured portion is fit in an attachment recess formed on the inner wall of a lower panel, and the free portion is contacted with the inner wall of a front panel.

In the preferred embodiment of the present invention, the case comprises the claw path opening, for allowing entry of the claw member. The claw path opening includes a claw entrance, formed on the rear panel of the case, and a claw sliding slot, formed on the lower panel to extend to the claw entrance. The claw member pushes the rear end of the instant film unit to eject it from the exit slot, in reciprocating along the claw sliding slot. The claw sliding slot is closed by a light shielding plate. The light shielding plate moves to an open position for partially opening the claw sliding slot, from a closed position for closing the claw sliding slot, in the first reciprocating motion of the claw member. And in the second reciprocating motion for ejecting the first instant film unit, the light shielding plate moves to a full-open position for substantially opening the whole of said claw sliding slot, from the open position. The claw entrance is closed by a light shielding skirt which is attached to the light shielding plate. The light shielding skirt closes the claw entrance at the beginning, and opens the claw entrance when the light shielding plate moves to the open position. The light shielding skirt is deformed elastically in a substantially L-shape, so that the rear end thereof is contacted with the inner wall of the rear panel.

On the inner wall of the lower panel, a recess is formed for containing the light shielding plate movably. A projected portion is disposed on the edge portion of the recess, and a press sheet is attached thereto. A projection is formed on the under face of the light shielding plate. The projection gets over a click pawl formed on the recess, when the light shielding plate moves to the open position. The click pawl prevents the light shielding plate returning to the open position after the light shielding plate moves to the open position. The light shielding plate includes a tapered end face, formed on its rear end, and an engaging recess, for receiving a portion of the claw member.

The claw member is attached rotatably to a driving plate sliding along the lower panel. When a contact portion of the claw member contacts with the under face of the light shielding plate, the claw member is pushed to reduce the degree of inclination against a bias member, and then the corner of the contact portion moves into the engaging recess and the claw engages with the tapered end face.

According to the present invention, it is possible to prevent the instant film unit thrusting out of the exit slot due to shocks or vibration, because the pair of thrust preventing members are disposed on the both ends in the widthwise direction inside of the exit slot. Also, the light shielding plate comprising the light shielding member is formed to move from the open position to the full-open position which is closer to the exit slot in the advancing direction. Therefore, a portion of the light shielding skirt, which is formed on the light shielding plate to protrude toward the opposite direction to the advancing direction, does not obstruct the claw member in the advancing operation between the claw and the instant film unit. Accordingly, it is possible to prevent placing a load on a driving system of the claw member.

BRIEF DESCRIPTION OF THE DRAWINGS

The above objects and advantages of the present invention will become more apparent from the following detailed description when read in connection with the accompanying drawings, in which:

FIG. 12A is an explanatory view, partially cutaway, illustrating the claw member in an initial state after an instant film pack is loaded;

FIG. 12B is an explanatory view, partially cutaway, illustrating the claw member at the beginning of its first advancing operation;

FIG. 13A is an explanatory view, partially cutaway, illustrating the claw member moving to a return position in the first advancing operation;

FIG. 13B is an explanatory view, partially cutaway, illustrating the claw member returning to the initial position to complete the first advancing operation;

FIG. 14A is an explanatory view, partially cutaway, illustrating the claw member starting the second advancing operation in response to printing operation;

FIG. 14B is an explanatory view, partially cutaway, illustrating the claw member moving to the return position by the second advancing operation.

DETAILED DESCRIPTION OF THE PREFERRED EMBODIMENT(S) OF THE PRESENT INVENTION

Figure 1:
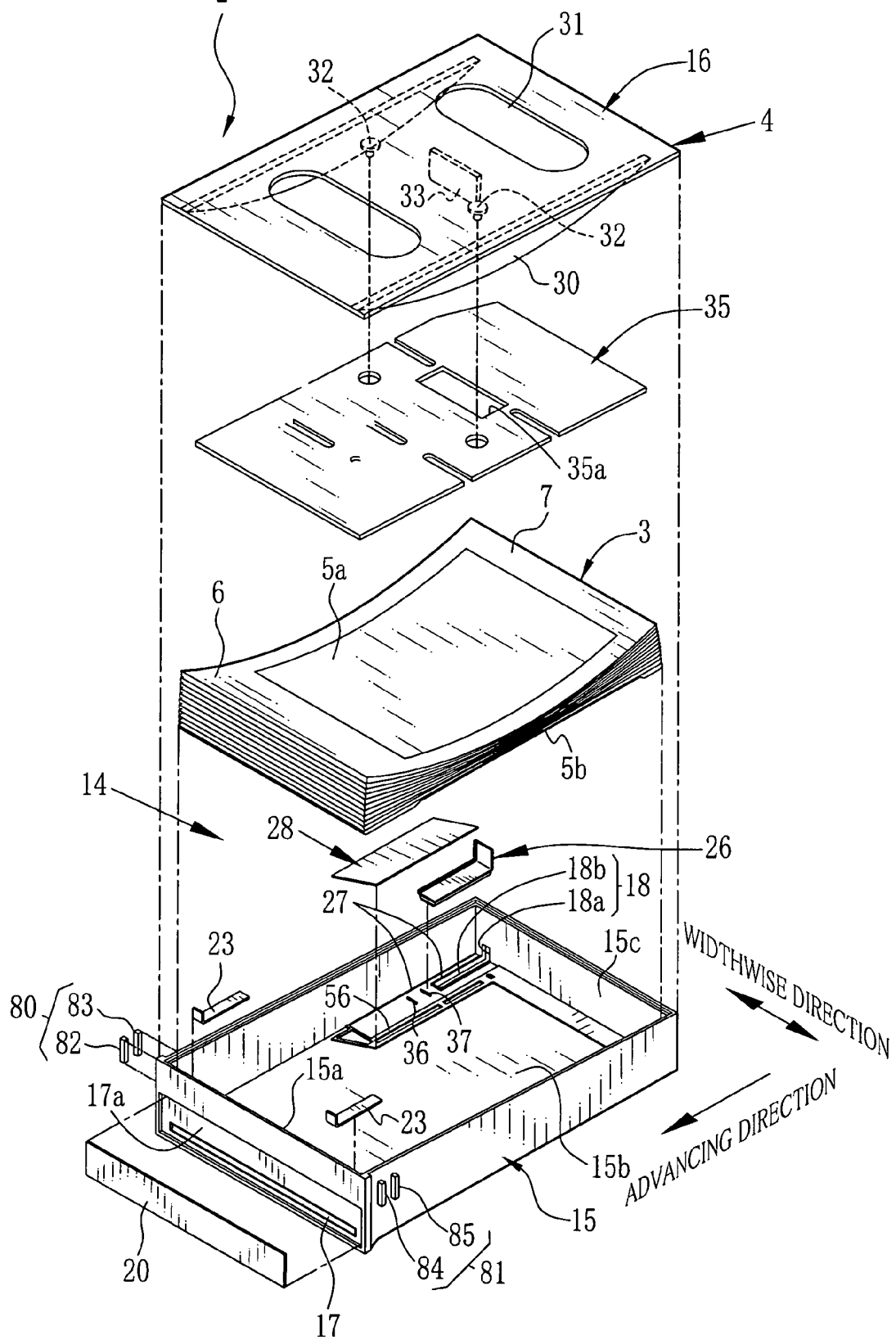
FIG. 1 is an exploded perspective view illustrating an instant film pack.

As shown in FIGS. 1, an instant film pack 2 is constituted by a plurality of instant film units 3 and a case 4 for containing a stack of the instant film units. Each of the instant film units 3 is a transmission type, wherein an exposure surface to be exposed is different from (opposite to) a positive image observation surface 5a where an image is formed. The upper surface 5a is the positive image observation surface, and the lower surface 5b is the exposure surface. The instant film unit 3 is contained with the exposure surface facing to a lower panel 15b of a case body 15. A blank region 6 is provided with a developing pod portion for containing developing solution. A blank region 7 is provided with a trap portion to absorb and trap a surplus of developing solution.

The case 4 is consisted by a case body 15 and a case lid 16. The case body 15 has a box shape, whose upper surface is open. The case lid 16 is attached to the case body 15, and closes the upper surface thereof. Each of the case body 15 and the case lid 16 is formed from plastic material having a light-blocking property and elasticity. A front panel 15a of the case body 15 is provided with an exit slot 17 for ejecting one instant film unit 3 at a time in an advancing direction. The exit slot 17 is a slit-like opening which extends in a widthwise direction perpendicular to the advancing direction. The instant film unit 3 is contained in the case body 15 with the blank region 6 facing to the exit slot 17.

On a lower panel 15b and a rear panel 15c of the case body 15, in FIG. 1, a claw path opening 18 is formed to receive insertion of a claw member well-known in the art for advancing the lowest one of the instant film units 3 at a time toward the exit slot.

The claw path opening 18 is of L-shaped in section, composed of a claw path entrance 18a and a claw sliding slot 18b. The claw entrance 18a is an opening for entry of the claw member into the case 4, formed to be short in length on the rear panel 15c. The claw sliding slot 18b is a moving passage for the claw member to advance the instant film unit 3, formed to be long in length on the lower panel 15b.

A light shielding flap 20 is attached to the outside of the exit slot 17. The light shielding flap 20 is formed of a film sheet material provided with a light-blocking property such as polyester or polyethylene terephthalate (PET), and has flexibility. An adhesive agent 21 is used to attach the light shielding flap 20 to a region 17a adjacent to the exit slot 17. According to this, one side of the light shielding flap 20 is turned over by the instant film unit 3 advanced out of the case 4, and the exit slot 17 is opened consequently.

At the both ends of the exit slot 17, a pair of thrust preventing flaps 23 is attached. The thrust preventing flap 23 is made of such a material as polyester and PET with flexibility and formed into a sheet, and is bent to have a substantially L-shape in section. A flat portion of the thrust preventing flap 23 is attached on the lower panel 15b of the case body 15 with an adhesive agent. An upright portion of the thrust preventing flap 23 extends upward beyond the exit slot 17.

A shielding mechanism 14 is provided in order to block ambient light coming into the claw path opening 18. The shielding mechanism 14 includes a light shielding member 26 with a light-blocking property and flexibility, a rail portion 27, a press sheet 28, and click pawls 36 and 37. The light shielding member 26 is movable along the rail portion 27, held by the click pawls 36 and 37 in any one position among a closed position, an open position, and a full-open position. The light shielding member 26 is shifted to these positions in sequence by the claw member. The claw path opening 18 is appeared when the light shielding member 26 is in the open position and the full-open position. The press sheet 28 presses the light shielding member 26 toward the claw path opening 18.

The case lid 16 has a flat plate shape. A pair of arc-shaped ribs 30 is formed on an inner face of the case lid 16 to press the both ends of the plural instant film units 3 contained in the case body 15. Two elongated pressing openings 31, two welded pins 32 and a plate-like pressing piece 33 are disposed between the ribs 30. When an optical printer is loaded with the instant film pack 2, the pressing openings 31 receive insertion of a pressing member of the printer. A resilient sheet 35 is attached to the inside of the case lid 16 with the welded pins 32. The pressing piece 33 is inserted through an insertion slot 35a formed in the resilient sheet 35, and presses downward the upper surface of the instant film unit 3 in the center.

The resilient sheet 35 is a thin sheet made of plastic having a light-blocking property. When the instant film pack 2 is unused, the resilient sheet 35 closes the pressing openings 31 of the case lid 16 to block ambient light into the case 4. When the instant film pack 2 is set in an optical printer and the pressing member is inserted through the pressing openings 31, the resilient sheet 35 is bent by the pressing of the pressing member. By the force of the pressing member and its own resiliency, the resilient sheet 35 presses the instant film units 3 in whole, especially on both ends thereof in the advancing direction, toward the lower panel 15b.

Figure 2:
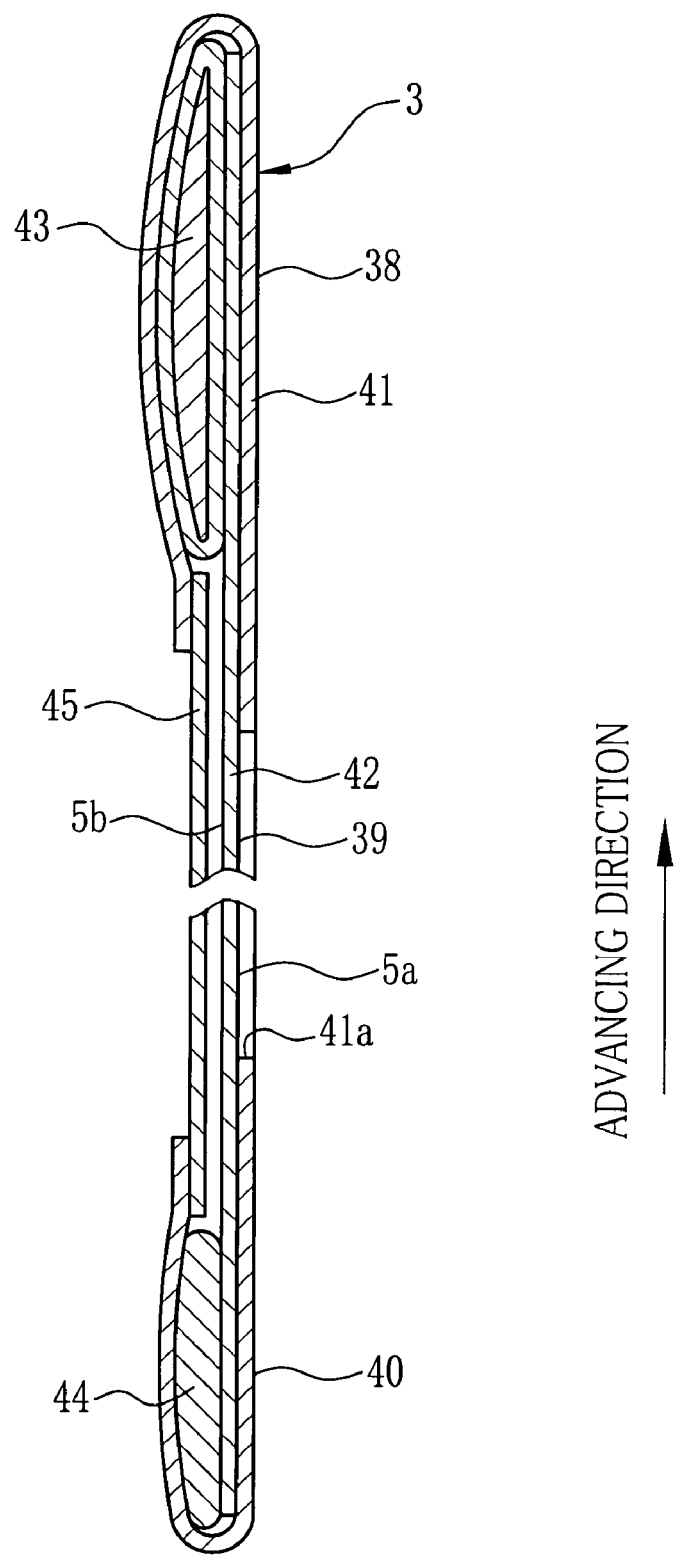
FIG. 2 is a sectional view illustrating the instant film unit.

As illustrated in FIG. 2, the instant film unit 3 is a thin, sheet-like self-developing type film, in which a developing pod portion 38, an exposure portion 39, and a trap portion 40 are formed in this order from the downstream side in the advancing direction (the upper end). The instant film unit 3 is composed of a mask sheet 41, a photosensitive sheet 42, a developing pod 43, a trapping material 44, a cover sheet 45, and the like. The cover sheet 45 has transparency. The photosensitive sheet 42 is formed by laminating the photosensitive layer, the diffusing/reflecting layer, and an image receiving layer one on top of the other from the side of the exposure surface 5b.

The mask sheet 41 is a sheet made of a thin plastic material, on which an opening 41a is formed. The edge of the opening 41a serves as a mask for defining the exposing area. The photosensitive sheet 42 is formed to have the same length in the widthwise direction as the mask sheet 41, and attached to a rear surface of the mask sheet 41, so as to close the opening 41a.

On the rear surface of the photosensitive sheet 42, the developing pod 43 and the trapping material 44 are secured with an adhesive agent above and below the opening 41a. The cover sheet 45 is disposed between the developing pod 43 and the trapping material 44. Each end of the mask sheet 41 is folded to wrap the developing pod 43 and the trapping material 44, secured by adhesive agent to the rear surface of the cover sheet 45.

The developing pod 43 is formed in a substantially bag shape, containing the developing solution in the inside thereof. When a spreading roller set in the optical printer tears open the developing pod, the developing solution spreads out between the photosensitive sheet 42 and the cover sheet 45. Then a latent image recorded in the photosensitive layer of the photosensitive sheet 42 is transferred to the image receiving layer of the photosensitive sheet 42 as a positive image through the diffusing/reflecting layer. The positive image transferred to the image receiving layer is observable from the positive image observation surface 5a.

Spacer rails are attached on the both ends of the photosensitive sheet 42, and on the spacer rails, the both edges of the cover sheet 45 is attached. Owing to those spacer rails, a gap with certain height is formed between the photosensitive sheet 42 and the cover sheet 45, and the developing solution flowing out of the developing pod 43 is spread evenly within the gap.

The trapping material 44 is attached to the photosensitive sheet 42, on the upstream side in the advancing direction. A surplus of the developing solution in the developing process is absorbed and trapped by the trapping material 44.

Figure 3:
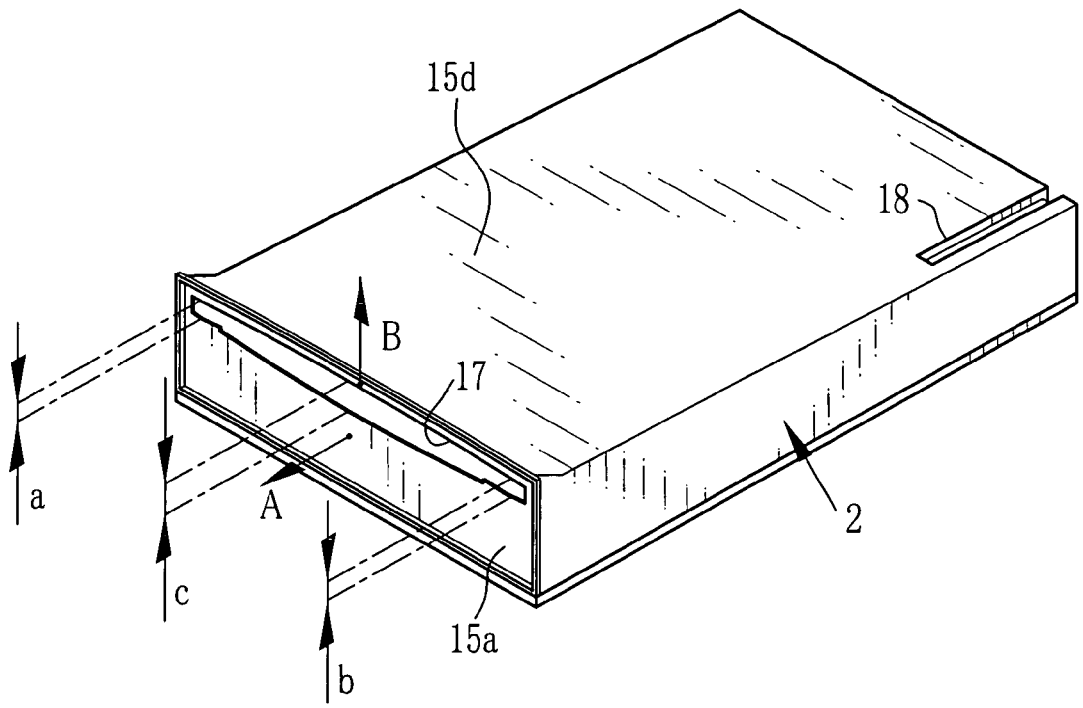
FIG. 3 is a perspective view illustrating the instant film pack.

As illustrated in FIG. 3, if the instant film pack is subjected to a shock or vibration by being dropped, because of the resilient sheet 35 and the like pressing the instant film unit 3, the exit slot 17 is deformed such that a gap c at the central part becomes larger than the gaps a and b at the both ends in the widthwise direction. According to this deformation, the front panel 15a extends forward to A and the upper panel 15d extends upward to B. Therefore, the instant film unit 3 in the case 4 is likely to thrust out of the exit slot 17.

Figure 4:
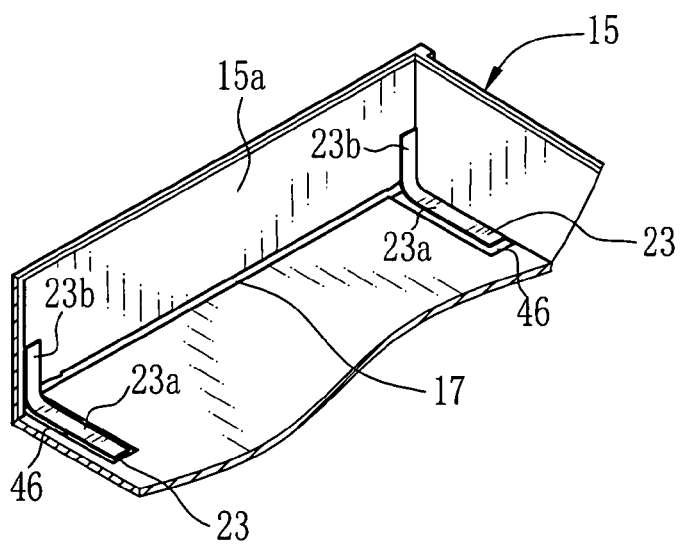
FIG. 4 is a perspective view, partially cutaway, illustrating an inner wall of the front side of a case body.

As depicted in FIG. 4, due to being attached to both ends of the inner wall of the exit slot 17, the thrust preventing flap 23 closes the both ends of the exit slot 17 by the elastic force and prevents the instant film unit 3 thrusting out of the exit slot 17. Although the thrust preventing flap 23 may be attached at the central part of the exit slot 17, it works more effectively at the both ends because the gap of the both ends is smaller than that of the central part after the deformation.

Figure 5:
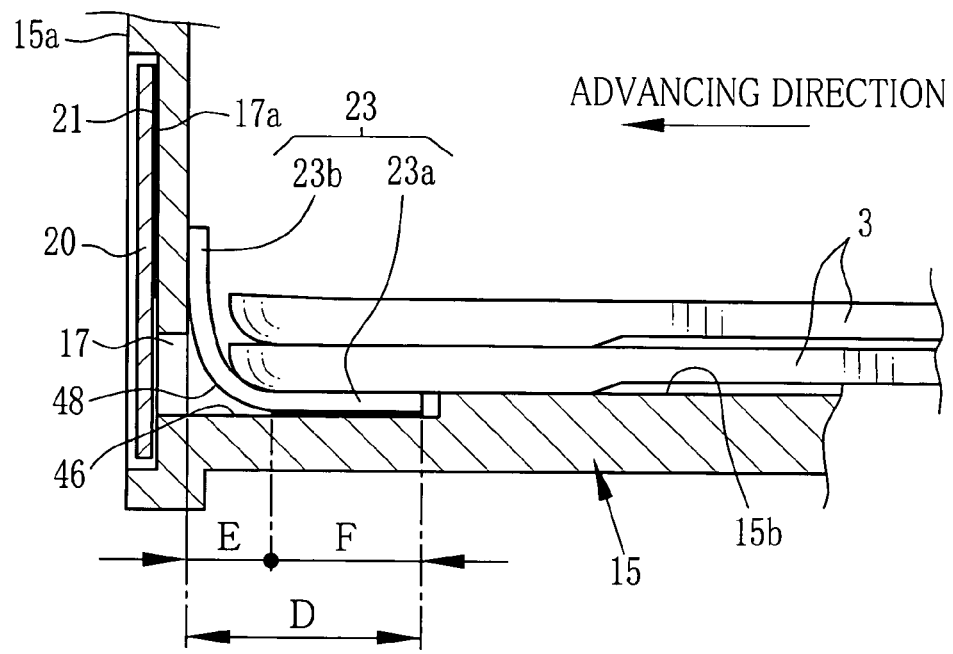
FIG. 5 is a partial section view illustrating the front portion of the case body.

Also, as illustrated in FIG. 5, in the thrust preventing flap 23, one end 23a is attached to a recess 46 on the lower panel 15b of the case body 15. The remaining end 23b extends upright along the inner wall of the front panel 15a to partially close the exit slot 17. The thrust preventing flap 23 is attached with an adhesive agent only in the length F, which subtracts the length E forming a rounded portion 48 from the length D, so as to form a rounded portion 48 between the one end 23a and the remaining end 23b. In this manner, attaching only in the length F leads to form the rounded portion 48 between the downstream-side leader edge of the instant film unit 3 in the advancing direction and the inner wall of the front panel 15a. The rounded portion 48 provides a cushion effect, and serves to improve the effect of preventing the lowest one of the instant film units 3 from thrusting out of the exit slot 17. The elastic force of the thrust preventing flap 23 is regulated such that the thrust preventing flap 23 is bent at the rounded portion 48 by pressing of the lowest one of the instant film unit 3 in being ejected from the exit slot 17, then the remaining end 23b of the thrust preventing flap 23 is pushed into the exit slot 17 as the instant film unit 3 is advanced, and finally the remaining end 23b becomes to thrust outside of the exit slot 17.

Figure 6:
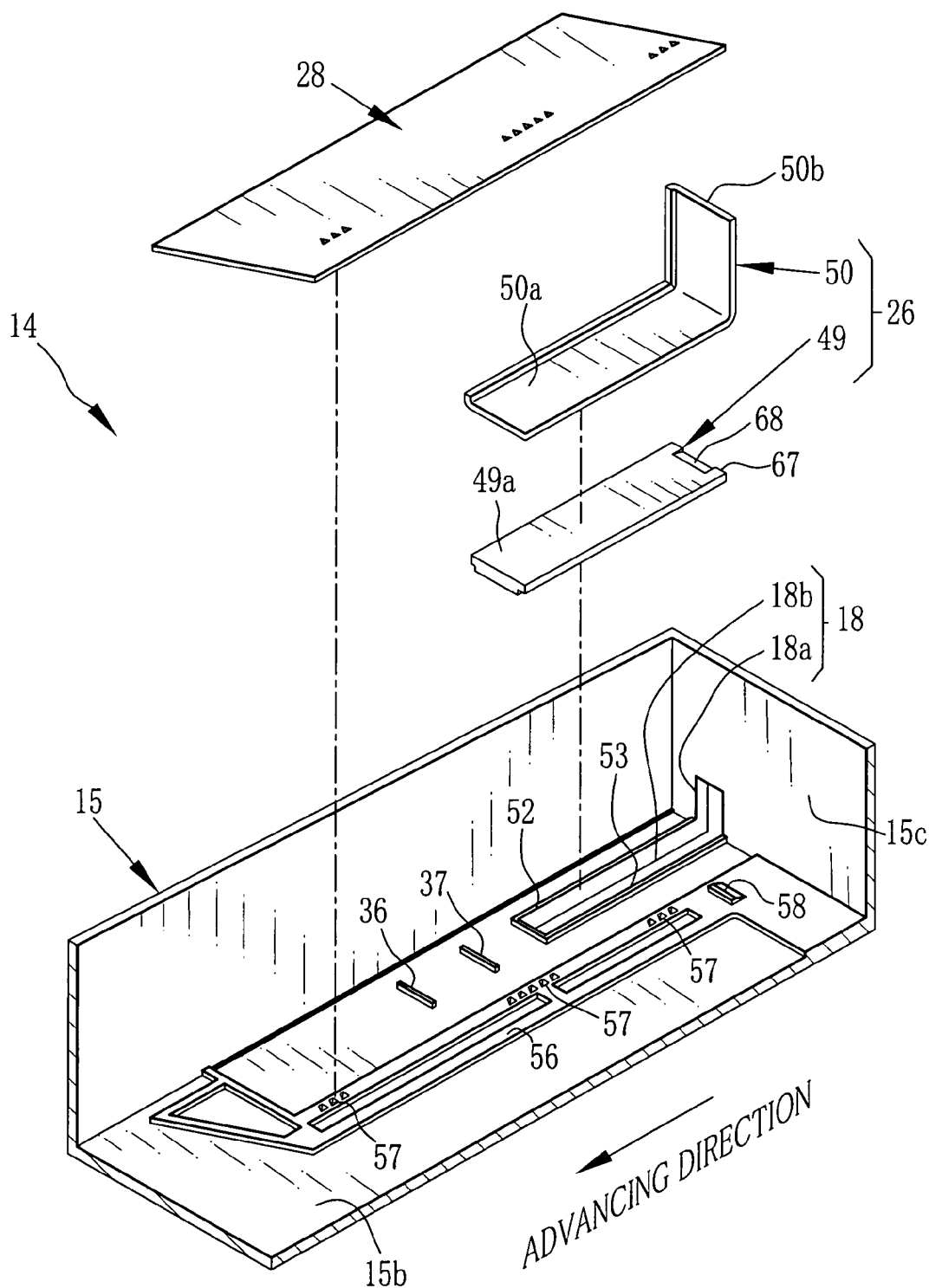
FIG. 6 is a partial perspective view illustrating a claw path opening formed in the case body.

In FIG. 6, it is shown that a structure of a light shielding mechanism for shielding the claw path opening 18 from the inside of the case 4. The light shielding member 26 is composed of a light shielding plate 49 and a light shielding skirt 50. The light shielding skirt 50 is a thin plastic film, bent to be of L-shape in section. A portion corresponding to the long side of the L-shape in section is an attachment portion 50a attached to an upper surface 49a of the light shielding plate 49. A portion corresponding to the short side is a vertical portion 50b, for shielding the claw entrance 18a of the claw path opening 18. The light shielding skirt 50 is formed from plastic film, such as aluminum foil, polyester, nylon, polyethylene terephthalate, or the like.

Figure 7:
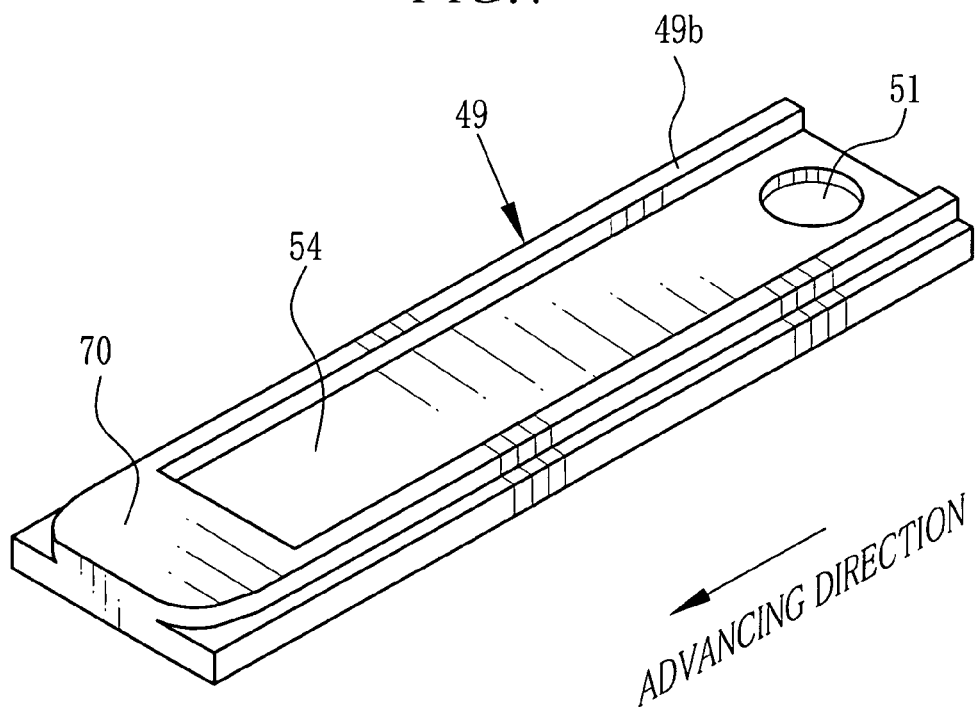
FIG. 7 is a perspective view illustrating the rear side of a light shielding plate.

The light shielding plate 49 closes the claw sliding slot 18b of the claw path opening 18. As illustrated in FIG. 7 in details, an engaging recess 51 is formed on the under face of the light shielding 49. Also, a pair of ridges 52 and 53 is formed on the edges in the widthwise direction of the claw sliding slot 18b. The pair of ridges 52 and 53 extends toward the advancing direction to fit on the outsides of a recess portion 54 formed on the under face 49b of the light shielding plate 49. Thus, in cooperating with the under face 49b, the pair of ridges constitutes a labyrinth structure for preventing the entry of ambient light. Further, in order to ensure the effect of light shielding, the case lid 16 and the case body 15 may be welded together, for example, by the ultrasonic welding. Such the ultrasonic welding to the other portions might weld the light shielding plate 49 to the case body 15 as well. Therefore, the material retaining incompatibility with the case body 15 is suitably used for the light shielding plate 49. For example, when the material of the case body 15 is polystyrene, the light shielding plate 49 is preferably made of polycarbonate.

Figure 8:
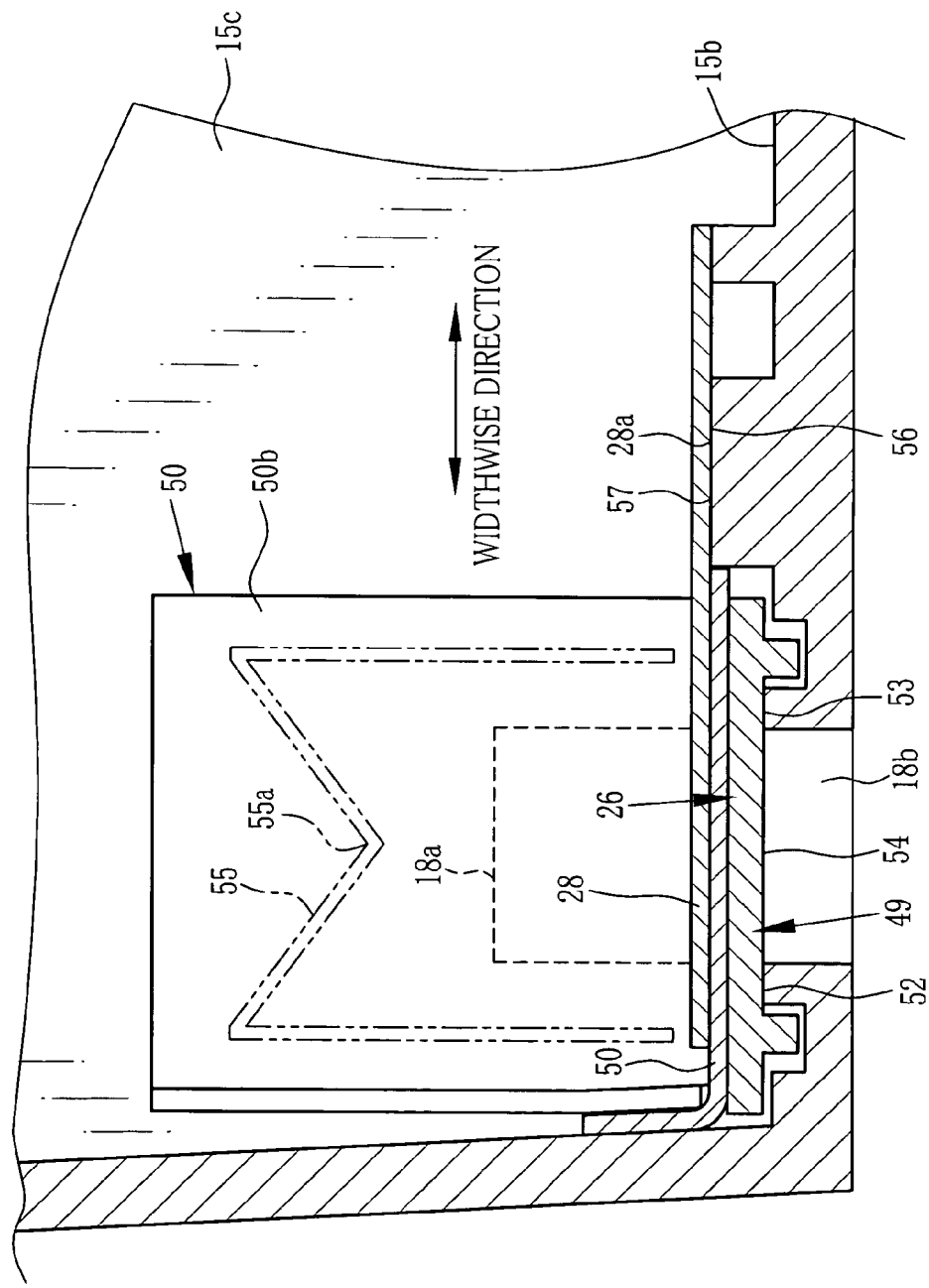
FIG. 8 is a partial perspective view, cutaway in a widthwise direction, illustrating a claw path opening formed in the case body.

The vertical portion 50b of the light shielding skirt 50 is attached to the rear panel 15c of the case body 15, in order to close the claw entrance 18a completely. If the attachment is too firm, however, it is hard to peel off the vertical portion 50b when the claw member moves the light shielding plate 49 to the open position. According to this, the driving system of the claw member is imposed a heavy load in peeling off the vertical portion 50b. Therefore, for the purpose of reducing the load on the claw member and keeping a light-blocking property, the adhesive region 55 is defined in the present embodiment to be a narrow M-shape surrounding the left, right, and top of the claw entrance 18a, as indicated by a phantom line in FIG. 8. The attachment in this manner ensures the easiness in peeling off comparing to the adhesive region of a rectangle opened the lower side. In entering into the claw entrance 18a, the claw member gradually peels off the adhesive region 55 of reverse V-shape, from the apex 55a. Consequently, the adhesive region 55 can be readily peeled off.

Figure 9:
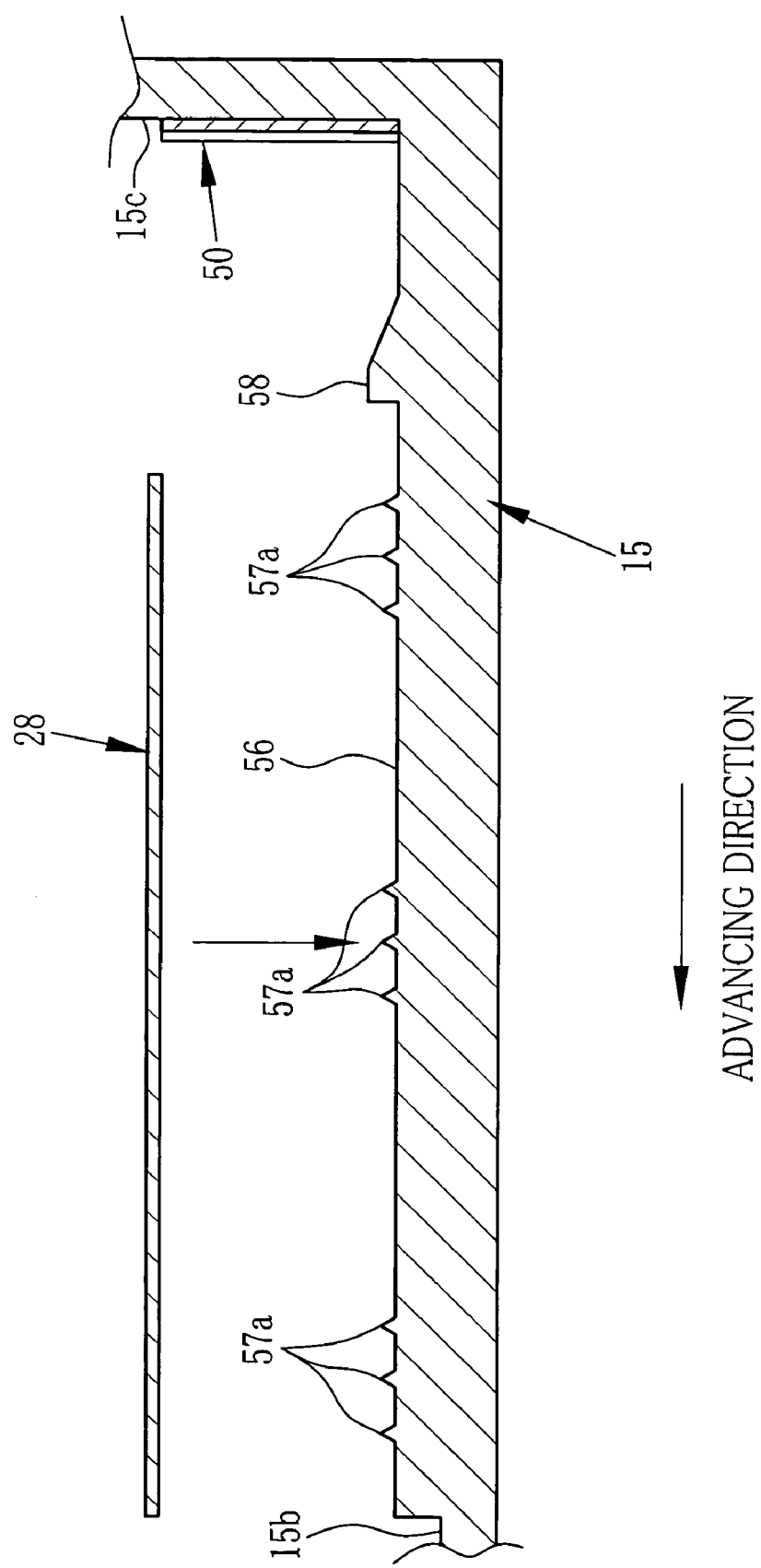
FIG. 9 is a cross-section view illustrating a press sheet separated from a case body.

The press sheet 28 presses the light shielding member 26 from above. The press sheet 28 is made of an elastic material with small thickness, and is long in the widthwise direction proximate to the light shielding member 26. A projected portion 56 is disposed on the lower panel 15b, adjacent to a sliding path of the light shielding member 26. The press sheet 28 includes the lateral end 28a which is secured to the upper face of the projected portion 56 by ultrasonic welding. As indicated in FIG. 9, there are plural welding portions 57 along the advancing direction, and an energy director 57a (See FIG. 9) is previously formed on the upper face of the projected portion 56 corresponding to the welding portion 57. Thus, as illustrated in FIG. 10, the lateral end 28a of the press sheet 28 is secured to the projected portion 56, and the remaining free end 28b presses the light shielding member 26 not to heave.

The press sheet 28 is preferably formed of the same material as the case body 15, such a plastic sheet as polystyrene or the like, so that it is easy to be welded with the case body 15. And the sheet preferably has thickness of 0.1~0.3 mm. Although the sheet may be transparent without a light-blocking property, it is more suitable to color the sheet with carbon black pigment and the like because coloring has an effect of preventing ambient light leaking into from the gap between the light shielding plate 49 and the case body 15.

The lowest one of the instant film unit 3 is placed on the press sheet 28. There is the possibility that the end of the press sheet 28 in the advancing direction catches the bulging portion on the surface contacting with the press sheet 28 of the instant film unit 3, such as the edge of the mask sheet 41, when the instant film unit 3 is ejected. Therefore, the press sheet 28 has a parallelogram shape with the rear end 28c and the leader end 28d thereof cut diagonally. By pulling out a band of plastic sheet to have the width corresponds to the distance between the rear end 28c and the leader end 28d of the press sheet 28, and by cutting it diagonally, it is possible to make press sheets 28 of parallelogram shape consecutively.

Figure 10:
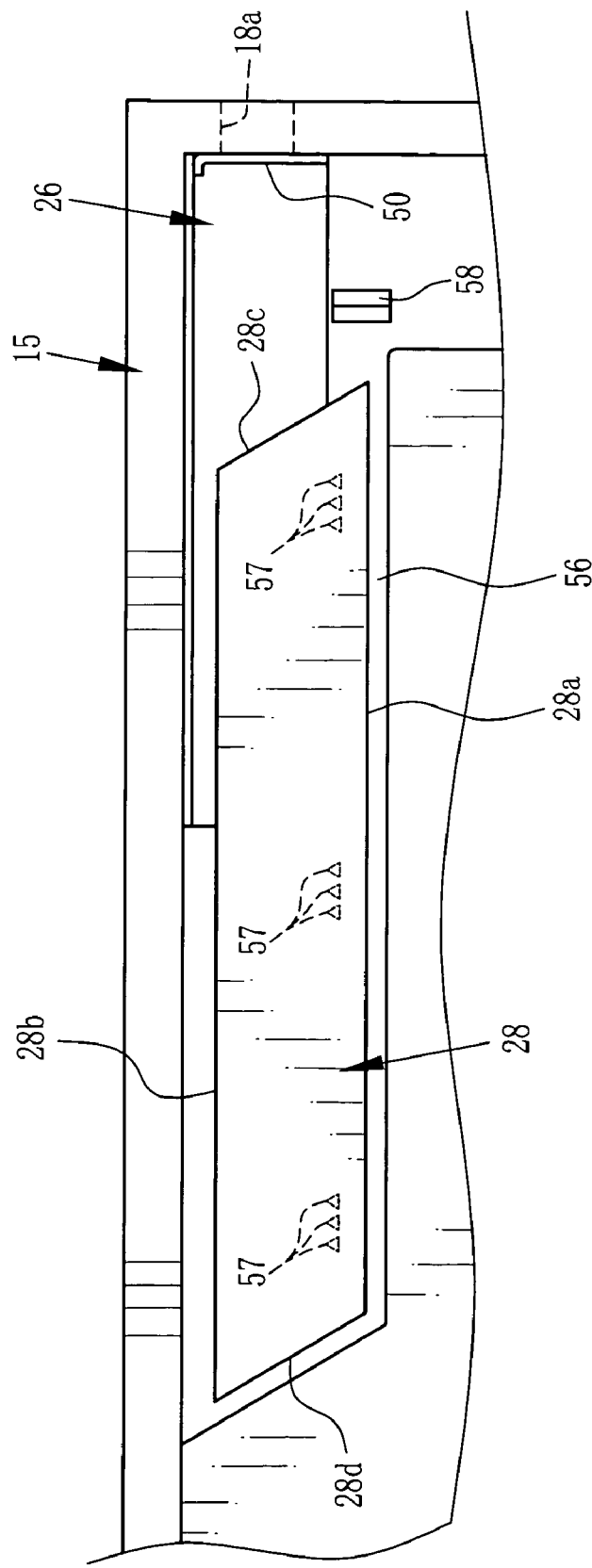
FIG. 10 is a plan view, from above, illustrating the press sheet attached to the case body.

Furthermore, on the upper face of the projected portion 56, a support block 58 is formed (FIG. 9 and FIG. 10). The support block 58 lifts up the instant film unit 3 being ejected to help it passing over the rear end 28c of the press sheet 28. According to this, the ejected instant film unit 3 is prevented from being caught by the press sheet 28. Thus, it is possible to keep the claw path opening 18 in light-tight, and to decrease the load on the driving system of the claw member.

The instant film unit 3 is loaded in the optical printer as a form of the instant film pack 2 containing a stack of plural instant film units 3 in the case 4. In the optical printer, the claw member makes one reciprocating motion for advancing operation in response to loading of the instant film pack 2. The claw member moves the light shielding member 26 to the open position while peeling off the light shielding skirt 50 from the rear panel 15c of the case body 15. And then, the claw member makes one advancing operation in response to the printing operation. The lowest one of the instant film unit 3 is ejected from the exit slot 17 by the second advancing operation of the claw member after the instant film pack 2 is loaded.

While the instant film unit 3 is ejected from the exit slot 17, an image is recorded one line after another in the photosensitive layer by an exposure head disposed in the optical printer. During the image recording, the leader end of the instant film unit 3 is nipped by a spreading roller set disposed in the optical printer. When the instant film unit 3 is nipped by the spreading roller set, the advancing operation of the claw member is finished and the instant film unit 3 is conveyed by the spreading roller set.

The spreading roller set nips and conveys the instant film unit 3 in the advancing direction. During the conveyance of the instant film unit 3, the developing pod 43 is torn open and the developing solution from the developing pod 43 spreads out between the cover sheet 45 and the photosensitive sheet 42. In this way, the instant film unit 3 is conveyed with being exposed, and the developing solution is spread after some delay from the exposure. The instant film unit 3 is ejected from the film exit slot of the optical printer after the exposure is finished. Thus, at a lapse of predetermined time, a positive image is appeared on the photosensitive layer of the instant film unit 3.

Figure 11:
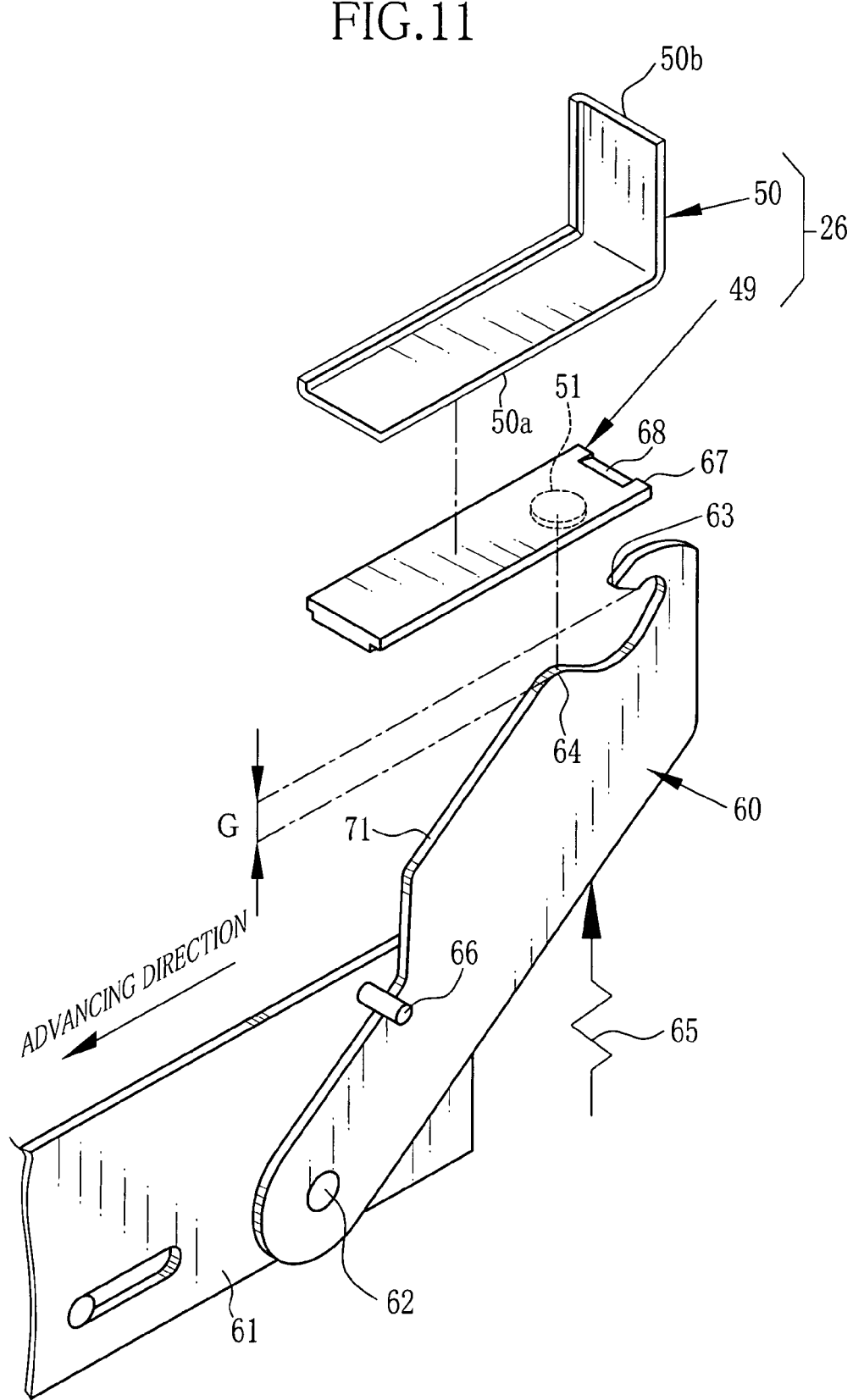
FIG. 11 is a schematic perspective view illustrating a claw member and a light shielding member.

A claw 63 is for hooking the light shielding member 26 or the upstream end of the instant film unit 3 in the advancing direction. As indicated in FIG. 11, the claw member 60 is attached to a driving plate 61 reciprocating along the advancing direction, via a rotational axis 62. The claw member includes the claw 63 disposed upstream in the advancing direction, and a contact portion 64 disposed downstream from the claw 63. A spring 65 biases the claw member so that the contact portion 64 is contacted with the light shielding member 26. In order to prevent the claw 63 failing to enter the claw entrance 18a, the rotation thereof is regulated by a stopper 66.

The claw member 60 moves with the driving plate 61 in the advancing direction, and the contact portion 64 is initially contacted with the under face of the light shielding member 26. The claw member 60 is pressed downward to the rotational position contacted with the under face, against the bias of the spring 65. Then, the claw 63 hooks the end 67 of the light shielding member 26. The contact portion 64 contacts with the light shielding plate 49 or the under face of the instant film unit 3 preceding the claw 63, and decides the position of the claw member 60 so that the claw 63 surely hooks the light shielding plate 49 or the rear end of the instant film unit 3. Further, a tapered face 68 is formed on the end 67 of the light shielding plate 49, so as to be hooked easily by the claw 63.

In this way, the rotational position of the claw member 60 is decided by the position in the vertical direction of the counterpart contacted with the contact portion 64. In the vertical direction perpendicular to the advancing direction, a gap G between the contact portion 64 and the claw 63 varies in accordance with the rotational position of the claw member 60, and becomes narrow as the claw member 60 rotates in the direction of pressing down the contact portion 64 against the bias of the spring 65. Thus, there is a problem that the claw 63 fails to hook the end 67 of the light shielding member 26 because the light shielding member 26 is located below the instant film unit 3 in the vertical direction. Therefore, an engaging recess 51 to reduce the rotation amount of the claw member 60 is formed on the recess portion 54 in the under face of the light shielding plate 49 (See FIG. 7). The engaging recess 51 is formed in the position where the claw 63 hooks the end 67 of the light shielding plate 49 after the claw member 60 is rotated to the rotational position where the gap G is increased by the contact portion 64 fitting in the engaging recess 51.

The vertical portion 50b of the light shielding skirt 50 extends upstream in the advancing direction from the light shielding plate 49. Accordingly, when the claw member 60 performs the advancing operation with the light shielding plate 49 in the open position, the vertical portion 50b gets into between the end 67 of the light shielding plate 49 and the claw 63 to place a heavy load on the claw member 60.

Therefore, as illustrated in FIGS. 12 to 14, plural click pawls 36 and 37 are provided on a sliding path of the light shielding member 26. A click pawl 37 is contacted with a projecting portion 70 to prevent the light shielding member 26 moving to the open position. As the claw 63 moves the light shielding member 26 to the open position and the projecting portion 70 gets over the click pawls 36 and 37, and thereby the light shielding member 26 is held between the open position and the full-open position. Namely, the click pawls 36 and 37 act to forbid the return of the light shielding member 26 to the closed position, which lies in the opposite direction to the advancing direction. The light shielding member 26 is moved to the full-open position by the second advancing operation of the claw member 60.

FIG. 12A illustrates a state shortly after the instant film pack 2 is loaded (an initial state). In the initial state, the claw path opening 18 is closed completely, since the light shielding member 26 is set in the closed position where the vertical portion 50b is attached to the rear panel 15c. After loading the instant film pack 2 is finished, the claw member 60 makes one advancing operation as a lost motion in response to the closing operation of the loading lid, to move the light shielding member 26 to the open position.

In advancing movement of the claw member 60 in the initial operation, as indicated in FIG. 12B, a slant portion 71 of the claw member 60 contacts with the under face of the light shielding plate 49. According to this, the claw member 60 moves toward the advancing direction with a clockwise rotation around the rotational axis 62 against the bias of the spring 65, so that the claw 63 can enter the claw entrance 18a. And, owing to the contact portion 64 moving into the engaging recess 51, the gap G (see FIG. 11) becomes wider comparing to the case where the contact portion 64 is contacted with the other portions of the under face of the light shielding plate 49 than the engaging recess 51. Thus, it is ensured that the claw 63 can hook the tapered end surface 68 on the end 67 of the light shielding plate 49.

After this, when the claw member 60 reaches the return position to switch from advancing motion to returning motion, as illustrated in FIG. 13A, the projecting portion 70 of the light shielding plate 49 gets over the two click pawls 36 and 37, against the pressing force from above the press sheet 28, to move to the open position. At this time, the vertical portion 50b is peeled off from the rear panel 15c and protrudes from the end 67 of the light shielding plate 49, in the opposite direction to the advancing direction. And then, as illustrated in the FIG. 13B, the claw member 60 returns to the initial position, and the preparation for printing is completed.

In response to the printing operation, the claw member 60 makes the advancing operation and the claw 63 hooks the upstream end 72 of the instant film unit 3 in the advancing direction. At this time, as illustrated in FIG. 14A, the vertical portion 50b is sandwiched between the end 72 and the slant portion 71. Thus, the light shielding member 26 is pushed toward the full-open position from the open position, and then moved to the full-open position due to the claw member 60 reaching the return position, as illustrated in FIG. 14B.

The light shielding member 26 in the full-open position provides the necessary space for the vertical portion 50b to enter between the slant portion 71 of the claw member 60 in the return position and the instant film unit 3. Thus, the subsequent advancing operation of the claw member 60 is not disturbed, and therein, an excessive load is not placed on the driving system of the claw member 60.

Because the instant film pack 2 of the present embodiment is used in the optical printer which exposes the instant film units outside the instant film pack, the exposure opening is not formed. Accordingly, there are two types of the instant film pack, the ones without the exposure opening and the others having the exposure opening. Therefore, it is necessary to use a device for preventing the instant film pack from being mis-loaded, so that the instant film pack having the exposure opening is not loaded on the optical printer using the instant film pack without the exposure opening, and in reverse, the instant film pack without the exposure opening is not loaded on the optical printer using the instant film pack having the exposure opening.

Thus, as depicted in FIG. 1, in the instant film pack 2 without the exposure opening of the present embodiment, pairs of ribs 80 and 81 are provided on the outside of each lateral panel in the widthwise direction of the case body 15. The pair of ribs 80 is constituted of the uniformly shaped two ribs 82 and 83 disposed at the predetermined intervals, and the other pair of ribs 81 is also constituted of the uniformly shaped two ribs 84 and 85 disposed at the predetermined intervals. Those pairs of ribs 80 and 81 are also disposed on the instant film pack having the exposure opening in a similar manner, to extend toward the direction of loading in a pack loading chamber of a printer or a camera. The height of the ribs determines the position of the instant film pack 2 in the widthwise direction while the intervals of the ribs determine the position of the instant film pack 2 in the advancing direction.

The pairs of the ribs 80 and 81 disposed on the instant film pack 2 of the present embodiment have larger intervals between them than the pairs of the ribs disposed on the instant film pack having the exposure opening (the interval between the rib 82 and the rib 83, and the interval between the rib 84 and the rib 85). Further, in the pack loading chamber of each printer and camera, each recess is formed to have a space for receiving the interval between the two ribs of each pair 80 and 81 disposed on the corresponding instant film pack 2. Therefore, the instant film pack 2 without the exposure opening of the present embodiment is unable to be loaded in the pack loading chamber of the printer and the camera using the instant film pack having the exposure opening, because the space between the ribs of instant film pack 2 is large and do not fit into the recess. Furthermore, in the instant film pack 2 of the present embodiment, each pair of ribs 80 and 81 disposed on the lateral panels has a different space between the ribs from the other. Thus, it is possible to prevent the instant film pack 2 being loaded in reverse.

Besides, the attachment position and the attachment method of the thrust preventing flap, the light-shielding method for the claw path opening, and the laminating method for the instant photo film can be suitably combined with other embodiments. Although each of the above embodiments is described as a reference to the instant film pack containing the instant photo film of a positive type, the present invention can be applied to the instant film pack containing the instant photo film of a negative type.

In the above embodiment, although the light shielding member consists of two components corresponding the light shielding plate and the light shielding skirt, it may consist of one component, for example, only the light shielding skirt.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An instant film pack, including a plurality of instant film units being stacked and a case of box shape for containing said instant film units, said instant film pack comprising:
   an exit slot, formed in said case, for ejecting one of said instant film units facing to said exit slot out of said case;
   a pair of thrust preventing members, for preventing the first one of said instant film units facing to said exit slot from thrusting out of said exit slot, said thrust preventing members closing the lateral ends of said exit slot openably;
   wherein said thrust preventing members are attached to said case.

2. An instant film unit as defined in claim 1, wherein each of said thrust preventing members includes a secured portion and a free portion, said secured portion being fixed to the inside of said case, and said free portion crossing said exit slot and being pushed by a leader end of said first instant film unit to come out from said exit slot.

3. An instant film unit as defined in claim 2, wherein said case includes a lower panel for supporting said first instant film unit, and a front panel perpendicular to said lower panel, provided with said exit slot, said secured portion being fit in an attachment recess formed on an inner wall of said lower panel, said free portion contacting with an inner wall of said front panel.

4. An instant film unit as defined in claim 3, wherein said thrust preventing member is a plastic sheet.

5. An instant film unit as defined in claim 4, further comprising:
   a claw path opening for receiving insertion of a claw member, said claw path opening including a claw entrance formed on a rear panel of said case and a claw sliding slot formed on said lower panel to extend to the claw entrance, said claw member pushing a rear end of said instant film unit to eject said instant film unit from said exit slot while reciprocating along said claw sliding slot;
   a light shielding plate for closing said claw sliding slot, said light shielding plate moving to a open position for opening partially said claw sliding slot from a closed position for closing said claw sliding slot in the first reciprocating motion of said claw member, said light shielding plate moving to a full-open position for substantially opening the whole of said claw sliding slot from said open position in the second reciprocating motion of said claw member for ejecting said first instant film unit;
   a light shielding skirt, attached to said light shielding plate, for closing said claw entrance, said light shielding skirt opening said claw entrance when said light shielding plate moves to said open position.

6. An instant film unit as defined in claim 5, wherein said light shielding skirt is deformed elastically in a substantially L-shape so that the rear end thereof is contacted with an inner wall of said rear panel.

7. An instant film unit as defined in claim 6, wherein said light shielding skirt is a plastic film.

8. An instant film unit as defined in claim 5, further comprising a press sheet, disposed between said light shielding plate and said first instant film unit.

9. An instant film unit as defined in claim 8, further comprising:
   a recess, disposed on said inner wall of said lower panel, for containing said light shielding plate movably;
   a projected portion disposed on the edge portion of said recess, said press sheet being attached to said projected portion;
   a click pawl disposed on said recess, said click pawl preventing said light shielding plate from returning to said open position after said light shielding plate moves to said open position;
   a projection, disposed on a under face of said light shielding plate, for getting over said click pawl when said light shielding plate moves to said open position.

10. An instant film unit as defined in claim 9, wherein said light shielding plate includes a tapered end face on its rear end and a engaging recess for receiving entry of a part of said claw member.

11. An instant film unit as defined in claim 10, wherein said claw member is attached rotatably to a driving plate sliding along said lower panel, said claw member being pushed to reduce the degree of inclination against a bias member, and then a corner of the contact portion being fit in said engaging recess and the claw engaging with said tapered end face when a contact portion of said claw member contacts with the under face of said light shielding plate.

* * * * *